(12) United States Patent
Martinez

(10) Patent No.: US 8,511,098 B2
(45) Date of Patent: Aug. 20, 2013

(54) SLIDEABLE LINER LINK ASSEMBLY

(75) Inventor: Gonzalo F. Martinez, Stuart, FL (US)

(73) Assignee: United Technologies Corporation, Hartford, CT (US)

( * ) Notice: Subject to any disclaimer, the term of this patent is extended or adjusted under 35 U.S.C. 154(b) by 1359 days.

(21) Appl. No.: 12/137,605

(22) Filed: Jun. 12, 2008

(65) Prior Publication Data

US 2009/0317175 A1    Dec. 24, 2009

(51) Int. Cl.
*F02C 7/20* (2006.01)

(52) U.S. Cl.
USPC .......... 60/796; 60/262; 60/799; 60/797; 29/889.22

(58) Field of Classification Search
USPC .......... 60/262, 796, 797, 798, 799, 752, 60/506, 770, 771; 403/61; 29/889.22; 239/265.33, 265.37, 265.39
See application file for complete search history.

(56) References Cited

U.S. PATENT DOCUMENTS

| | | | |
|---|---|---|---|
| 2,460,216 A * | 1/1949 | Dalton | 464/120 |
| 4,121,768 A | 10/1978 | Young | |
| 5,059,055 A | 10/1991 | DeGress et al. | |
| 5,088,279 A * | 2/1992 | MacGee | 60/226.1 |
| 5,127,224 A * | 7/1992 | Barcza et al. | 60/763 |
| 5,291,732 A | 3/1994 | Halila | |
| 5,782,294 A | 7/1998 | Froemming et al. | |
| 5,842,643 A * | 12/1998 | Lippmeier | 239/265.39 |
| 6,912,782 B2 | 7/2005 | Nguyen et al. | |
| 7,007,480 B2 | 3/2006 | Nguyen et al. | |
| 7,017,334 B2 | 3/2006 | Mayer et al. | |
| 7,093,440 B2 | 8/2006 | Howell et al. | |
| 7,225,622 B2 * | 6/2007 | Petty et al. | 60/771 |
| 7,338,244 B2 | 3/2008 | Glessner et al. | |
| 2005/0155352 A1 | 7/2005 | Agg | |
| 2007/0033921 A1 * | 2/2007 | Peters | 60/204 |
| 2007/0158527 A1 | 7/2007 | Farah et al. | |
| 2008/0022689 A1 | 1/2008 | Farah et al. | |

* cited by examiner

*Primary Examiner* — William H Rodriguez
*Assistant Examiner* — Steven Sutherland
(74) *Attorney, Agent, or Firm* — Carlson, Gaskey & Olds PC

(57) ABSTRACT

An example engine assembly includes a first attachment structure secured to an engine casing or an engine liner, and a second attachment structure secured to the other of the engine casing or the engine liner. A sliding member is held by the first attachment structure and is slideable relative to the first attachment structure between a first position and a second position. A pin structure moves with the sliding member between the first position and the second position. A link is pivotally connected to the second attachment structure and the pin structure.

17 Claims, 3 Drawing Sheets

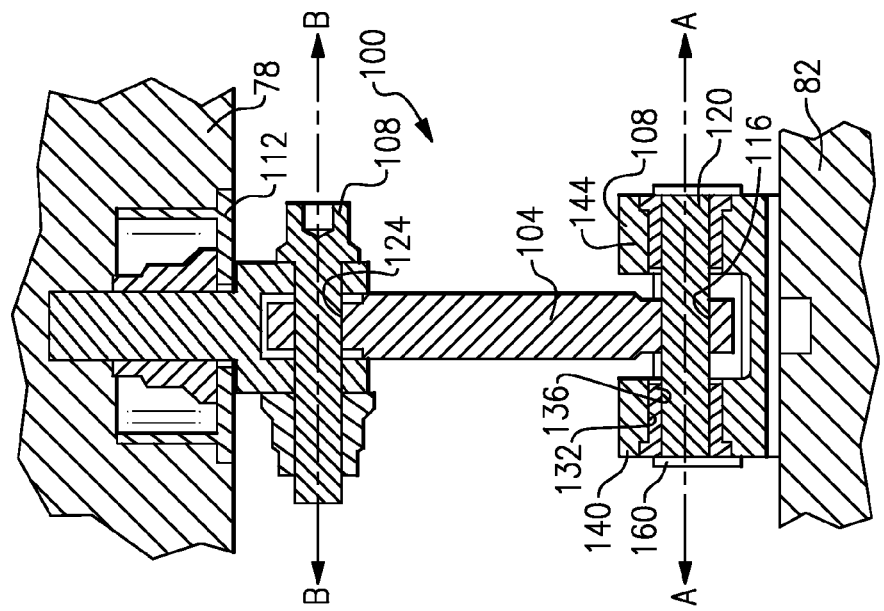
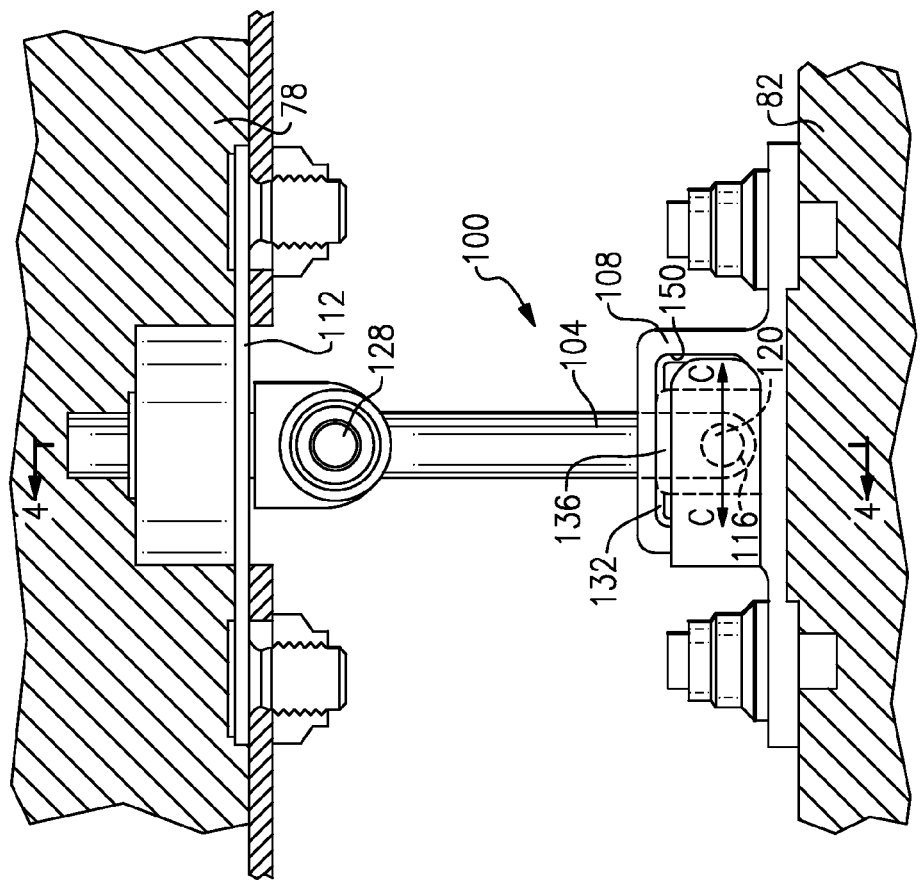

SLIDEABLE LINER LINK ASSEMBLY

BACKGROUND

This invention relates to a sliding link for securing a removable liner within an engine.

An exhaust section of a typical gas turbine engine includes a removable liner secured relative to an exhaust duct. The liner isolates the exhaust duct from the thermal energy of flow through the exhaust. Securing the liner in an installed position within the exhaust duct is a complex task based on manufacturing tolerances and complicated flow paths. Liner securing strategies further address thermal expansion.

Some liners are secured with liner hanger assemblies that include links. Typically, the exhaust liner is connected to one end of the link, and the exhaust duct is connected to the other end of the link. Some links include features that permit relative movement between the exhaust liner and the exhaust duct. Further, many features only accommodate relative movement between the exhaust liner and the exhaust duct in a single direction.

SUMMARY

An example engine assembly includes a first attachment structure secured to an engine casing or an engine liner, and a second attachment structure secured to the other of the engine casing or the engine liner. A sliding member is held by the first attachment structure and is slideable relative to the first attachment structure between a first position and a second position. A pin structure moves with the sliding member between the first position and the second position. A link is pivotally connected to the second attachment structure and the pin structure.

An example link assembly for securing an engine liner relative to a engine includes a pin structure slidably secured to a first attachment structure that is secured to an engine liner or an engine casing. A rod portion extends longitudinally between a first rod end and a second rod end. The first rod end is pivotally secured to the pin structure, and the second rod end is held by a second attachment structure secured to the other of the engine casing and the engine liner.

An example method of securing an engine liner relative to an engine casing includes the steps of pivotally connecting opposing ends of a link to respective one of an engine liner and an engine casing, and sliding one of the opposing ends relative to the respective one of the engine liner or the engine casing attachment structures. The method also includes pivoting the link while performing the step of sliding one of the opposing ends.

These and other features of the example disclosure can be best understood from the following specification and drawings, the following of which is a brief description:

BRIEF DESCRIPTION OF THE DRAWINGS

FIG. 3 shows a side view of an example link assembly;

FIG. 4 shows a sectional view through line 4-4 of FIG. 3; and

DETAILED DESCRIPTION OF THE PREFERRED EMBODIMENT

Figure 1:
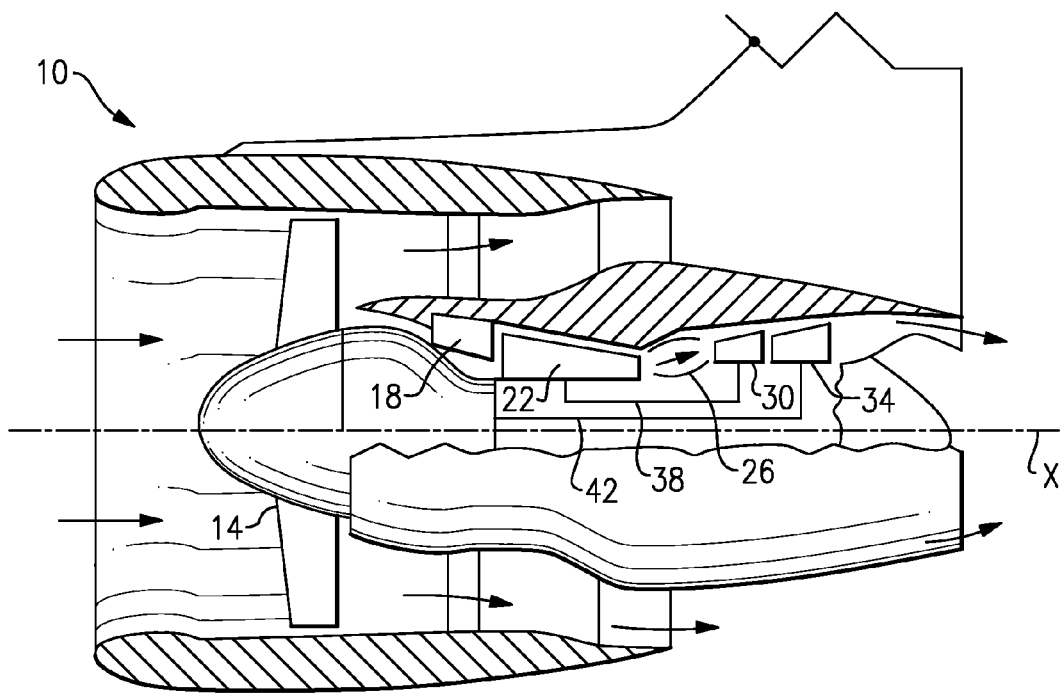
FIG. 1 schematically shows a sectional view of an example gas turbine engine.

FIG. 1 schematically illustrates an example gas turbine engine 10 including (in serial flow communication) a fan section 14, a low pressure compressor 18, a high pressure compressor 22, a combustor 26, a high pressure turbine 30, and a low pressure turbine 34. Types of example engines include turbojets, turbofans, turboprops, and turboshafts.

The gas turbine engine 10 is circumferentially disposed about an engine centerline X. During operation, the fan section 14 intakes air, and the compressors 18, 22 pressurize the air. The combustor 26 burns fuel mixed with the pressurized air. The high and low pressure turbines 30, 34 extract energy from the combustion gases flowing from the combustor 26.

In a two-spool design, the high pressure turbine 30 utilizes the extracted energy from the hot combustion gases to power the high pressure compressor 22 through a high speed shaft 38, and a low pressure turbine 34 utilizes the energy extracted from the hot combustion gases to power both the low pressure compressor 18 and a fan portion of the fan section 14 through a low speed shaft 42.

The example method may be used with other architectures such as a single spool axial design, a three spool axial design, and other architectures. That is, there are various types of gas turbine engine component and components within other systems, many of which could benefit from the examples disclosed herein.

Figure 2:
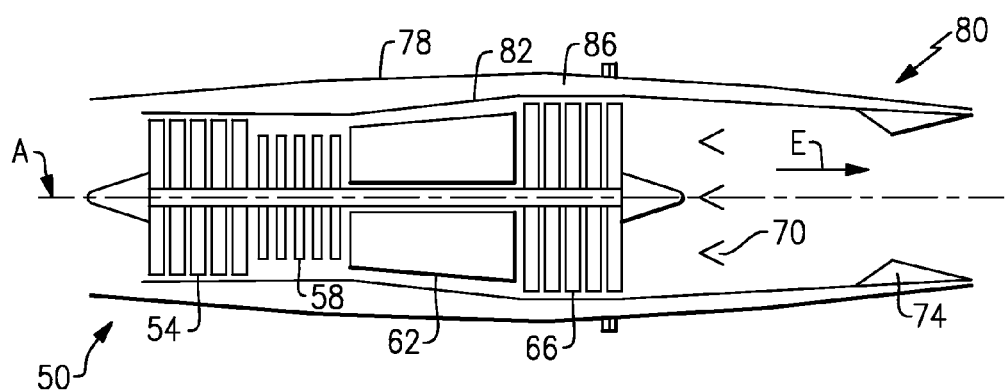
FIG. 2 schematically shows another example gas turbine engine.

Referring to the FIG. 2 schematic, an example turbo jet engine 50, another type of engine architecture, includes a fan section 54, a compressor section 58, a combustor section 62, a turbine section 66, an augmenter section 70, and a nozzle section 74. The compressor section 58, combustor section 62, and turbine section 66 are often referred to as the core engine. An axis A of the engine 50 is generally disposed and extends longitudinally through the sections. An engine duct structure 78, or engine casing, and an inner cooling liner structure 82 provide an annular secondary fan bypass flow path 86 around a primary exhaust flow path E within an exhaust section 80 of the engine 50. The bypass flow path 86 receives bypass flow from the fan section 54.

Referring now to FIGS. 3 and 4 with continuing reference to FIG. 2, an example link assembly 100 for securing the liner structure 82 relative to the engine duct structure 78 includes a longitudinally extending link 104. One end of the link 104 pivotably attaches to a first attachment structure 108, and the other end of the link 104 pivotally attaches to a second attachment structure 112. The first attachment structure 108 is secured to the liner structure 82, and the second attachment structure 112 is secured to the engine duct structure 78 or casing.

The example link 104 is thus pivotable relative to the first attachment structure 108 and the second attachment structure 112. In this example, the link 104 defines a first aperture 116, which receives a pin structure 120 held by the first attachment structure 108. The link 104 is pivotable relative to the first attachment structure 108 about an axis A defined by the pin structure 120, which secures the link 104 relative to the first attachment structure 108.

Another portion of the example link 104 defines a second aperture 124 for receiving a fastener 128. The link 104 is pivotable relative to the second attachment structure 112 about an axis B defined by the pin structure 120. The fastener 128 secures the link 104 to the second attachment structure 112. Pivotally attaching opposing ends of the link 104 relative to the first attachment structure 108 and the second attachment structure 112 accommodates motion of the liner structure 82 relative to the duct structure 78.

The example first attachment structure 108 defines a pair of slots 132 or apertures arranged on opposing sides of the link 104. A pair of slider blocks 136, a type of sliding member, are each moveable within a respective one of the slots 132. The example slider blocks 136 hold respective opposing ends of the pin structure 120. Thus, the pin structure 120 moves with the slider blocks 136, which changes the location of axis A, when the slider blocks 136 move within the respective one of the slots 132.

The example slider blocks 136 and pin structure 120 move linearly along a direction C, which is perpendicular to the axis A and the axis B. The slider blocks 136, the pin structure 120, and the axis A are translatable along direction C to facilitate pivoting the link 104, even as the position of the first attachment structure 108 relative to the second attachment structure 112 changes. Permitting movement of the axis A accommodates some relative movement between the first attachment structure 108 and the second attachment structure 112.

When connected, the example link 104 is positioned between a first flange 140 and a second flange 144 of the first attachment structure 108. The first flange 140 and the second flange 144 also hold the slider blocks 136. The pin structure 120 extends through the first aperture 116 between the slider blocks 136. The link 104, and particularly the portion of the link 104 defining the first aperture 116, is moveable along the pin structure 120 in the direction of axis A between the first flange 140 and the second flange 144. Permitting movement of the link 104 along the pin structure 120 accommodates relative movement between the first attachment structure 108, and the second attachment structure 112.

The slider blocks 136, the pin structure 120, and the axis A are moveable between multiple positions within the first attachment structure 108. In an example first position, the slider blocks 136 contact edges 150 of the first attachment structure. An example second position may include the slider blocks 136 centered within the slots 132 as shown.

Figure 5:
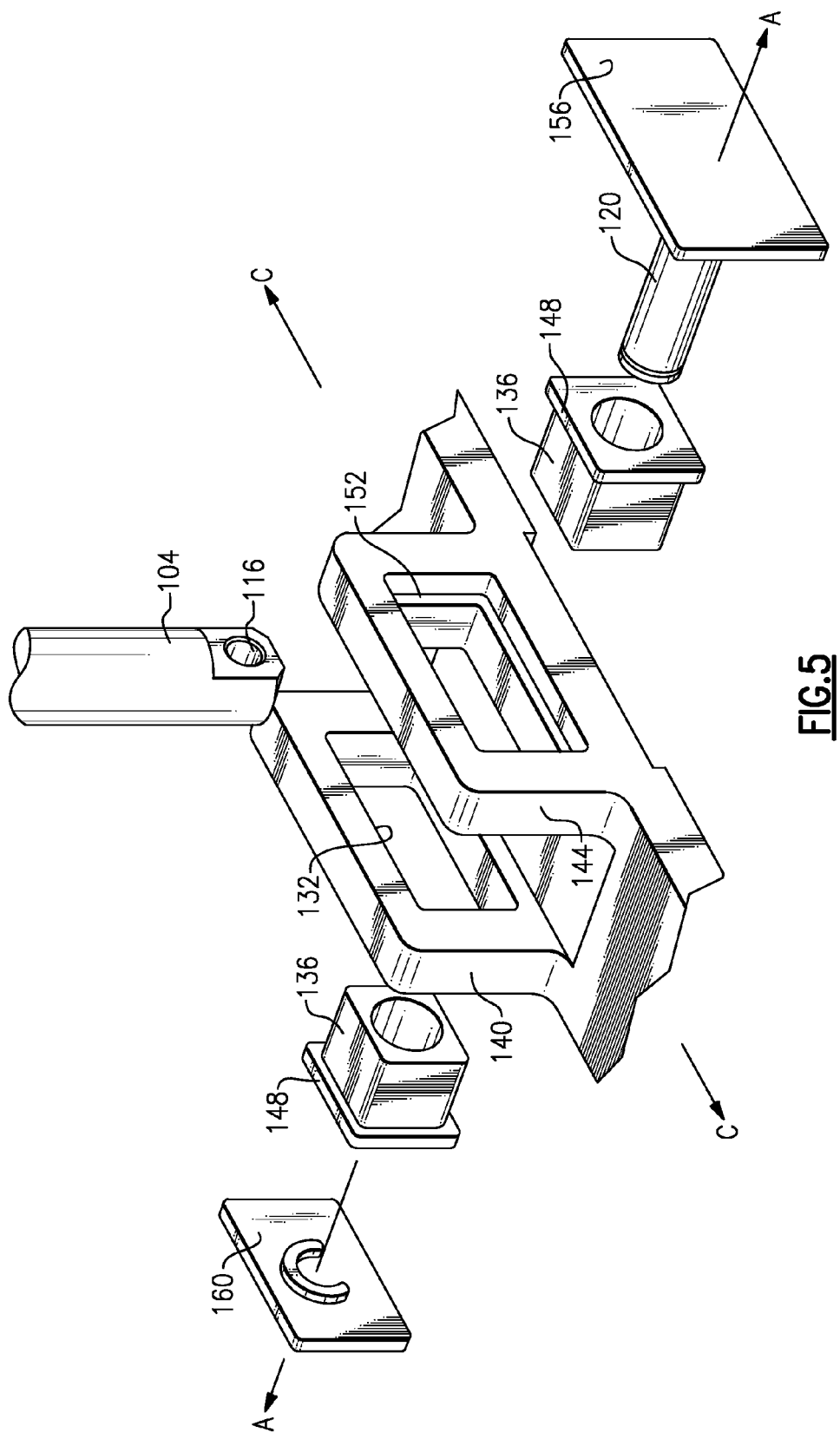
FIG. 5 shows an exploded partial view of the FIG. 3 link assembly.

Referring now to FIG. 5, the example slider blocks 136 include a collar area 148, which contacts a ledge area 152 of the first flange 144 or second flange 140 to limit movement of the slider blocks 136 toward the link 104 in the direction of axis A. The pin structure 120 includes an enlarged head 156 and a retainer 160 that similarly limit movement of the slider blocks 136 away from the link in the direction of axis A. The retainer 160 engages an end portion of the pin structure 120 in a known manner to hold the pin structure 120, which holds the slider blocks 136 within the slots 132.

Although a preferred embodiment has been disclosed, a worker of ordinary skill in this art would recognize that certain modifications would come within the scope of this invention. For that reason, the following claims should be studied to determine the true scope and content of this invention.

I claim:

1. A gas turbine engine comprising:
    a first attachment structure secured to one of an engine casing and an engine liner;
    a second attachment structure secured to the other one of the engine casing and the engine liner; wherein the engine casing and the engine liner together provide an annular bypass flow path;
    at least one sliding member held by the first attachment structure and slideable relative to the first attachment structure between a first position and a second position;
    a pin structure movable with the at least one sliding member between the first position and the second position; and
    a link pivotally connected to the second attachment structure and the pin structure,
    wherein the pin structure includes a retainer configured to hold an axial position of the pin relative to the at least one sliding member.

2. The engine of claim 1 wherein the link is pivotable about a first axis relative to the pin structure and the at least one sliding member moves between the first position and the second position in a direction transverse to the first axis.

3. The engine of claim 1 wherein the pin structure slides the at least one sliding member between the first position and the second position.

4. The engine of claim 3 wherein the link slides with the pin structure.

5. The engine of claim 1 wherein the at least one sliding member comprises a first slider block and a second slider block disposed on an opposite side of the link from the first slider block.

6. The engine of claim 5 wherein the first slider block and the second slider block each define apertures housing opposing end portions of the pin structure, the first slider block and the second slider block slideable within the apertures between the first position and the second position.

7. The engine of claim 1 including a fastener connecting the link to the second attachment structure, the link pivotable about the fastener.

8. The engine of claim 1 wherein the link is pivotable about a first axis defined by the pin structure, the first axis moveable with the at least one sliding member.

9. A link assembly for securing an engine liner relative to a gas turbine engine comprising:
    a pin structure slidably secured to a first attachment structure, the first attachment structure secured to at least one of an engine liner and an engine casing;
    a rod portion extending longitudinally between a first rod end and a second rod end, the first rod end is pivotally secured to the pin structure and the second rod end held by a second attachment structure secured to the other of the engine casing and the engine liner, wherein the pin structure is separate and distinct from the rod portion; and wherein the engine casing and the engine liner are configured to communicate an annular bypass flow.

10. The link assembly of claim 9 wherein the rod portion is pivotable relative to the pin structure, the first attachment structure, or both.

11. The link assembly of claim 9 wherein the rod portion is pivotable about an axis transverse to the sliding direction of the pin structure.

12. The link assembly of claim 9 wherein the rod portion includes an aperture for receiving the pin structure.

13. The link assembly of claim 9 including a fastener pivotally securing the second rod end to the attachment structure.

14. The link assembly of claim 13 wherein the rod portion includes an aperture receiving the fastener.

15. The link assembly of claim 9 wherein the pin structure is slideable back and forth between a first position and a second position.

16. A method of securing an engine liner relative to engine casing in a gas turbine engine comprising the steps of:
    pivotally connecting opposing ends of a link to one of an engine liner and an engine casing;
    sliding one of the opposing ends relative to the one of the engine liner and the engine casing closest to said one of the opposing ends; and
    pivoting the link relative to the engine liner and the engine casing while performing the sliding, wherein the engine liner and the engine casing provide an inner boundary and an outer boundary of a bypass flow path.

17. The method of claim 16, including sliding a slider block with one of the opposing ends.

* * * * *